(No Model.)  5 Sheets—Sheet 1.
T. CURLEY.
COUPLING FOR RAIL CAR STEAM HEATING PIPES.
No. 416,325. Patented Dec. 3, 1889.
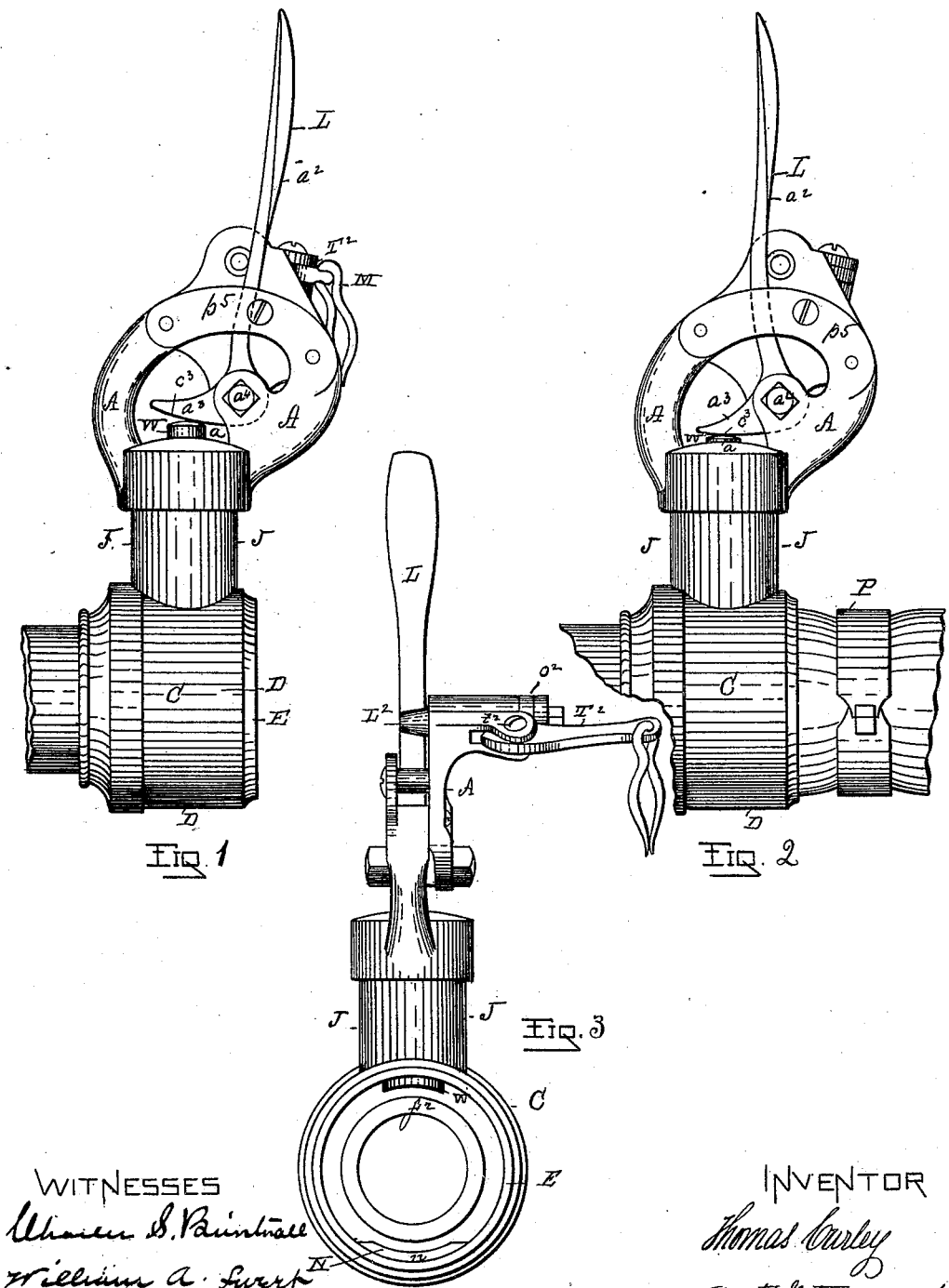
WITNESSES
INVENTOR
Thomas Curley

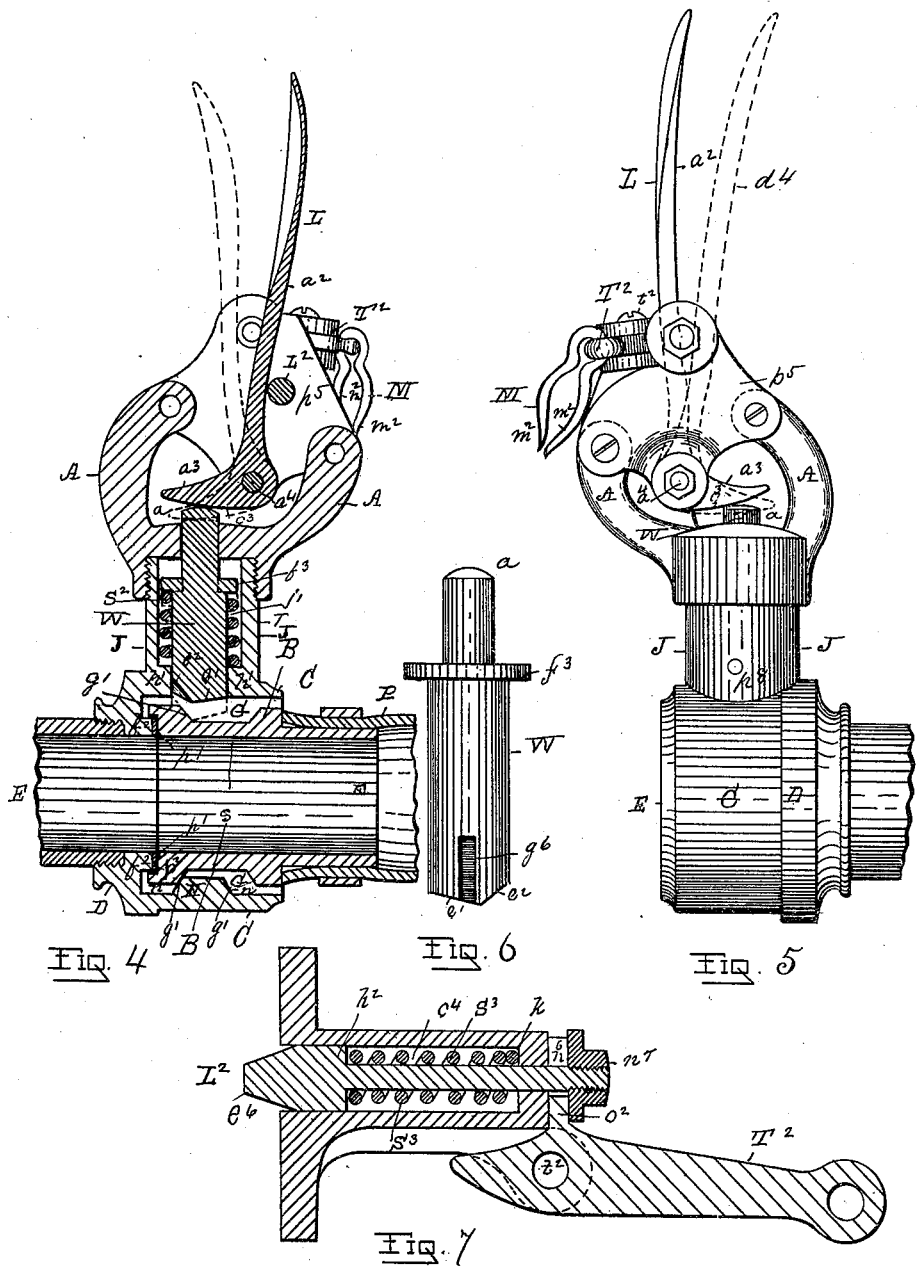

(No Model.) 5 Sheets—Sheet 3.
T. CURLEY.
COUPLING FOR RAIL CAR STEAM HEATING PIPES.
No. 416,325. Patented Dec. 3, 1889.
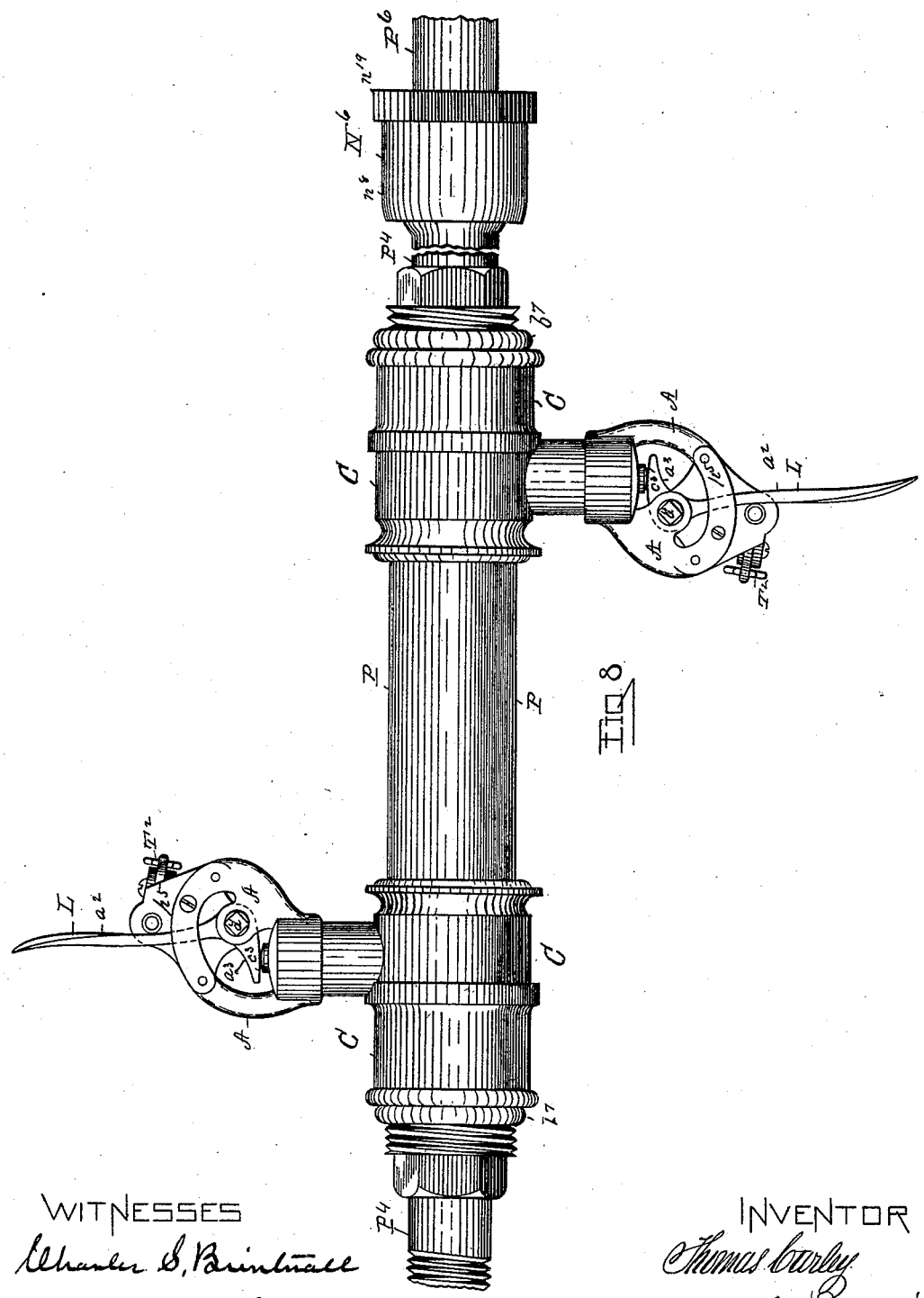
WITNESSES
INVENTOR (No Model.) 5 Sheets—Sheet 4.
T. CURLEY.
COUPLING FOR RAIL CAR STEAM HEATING PIPES.
No. 416,325. Patented Dec. 3, 1889.
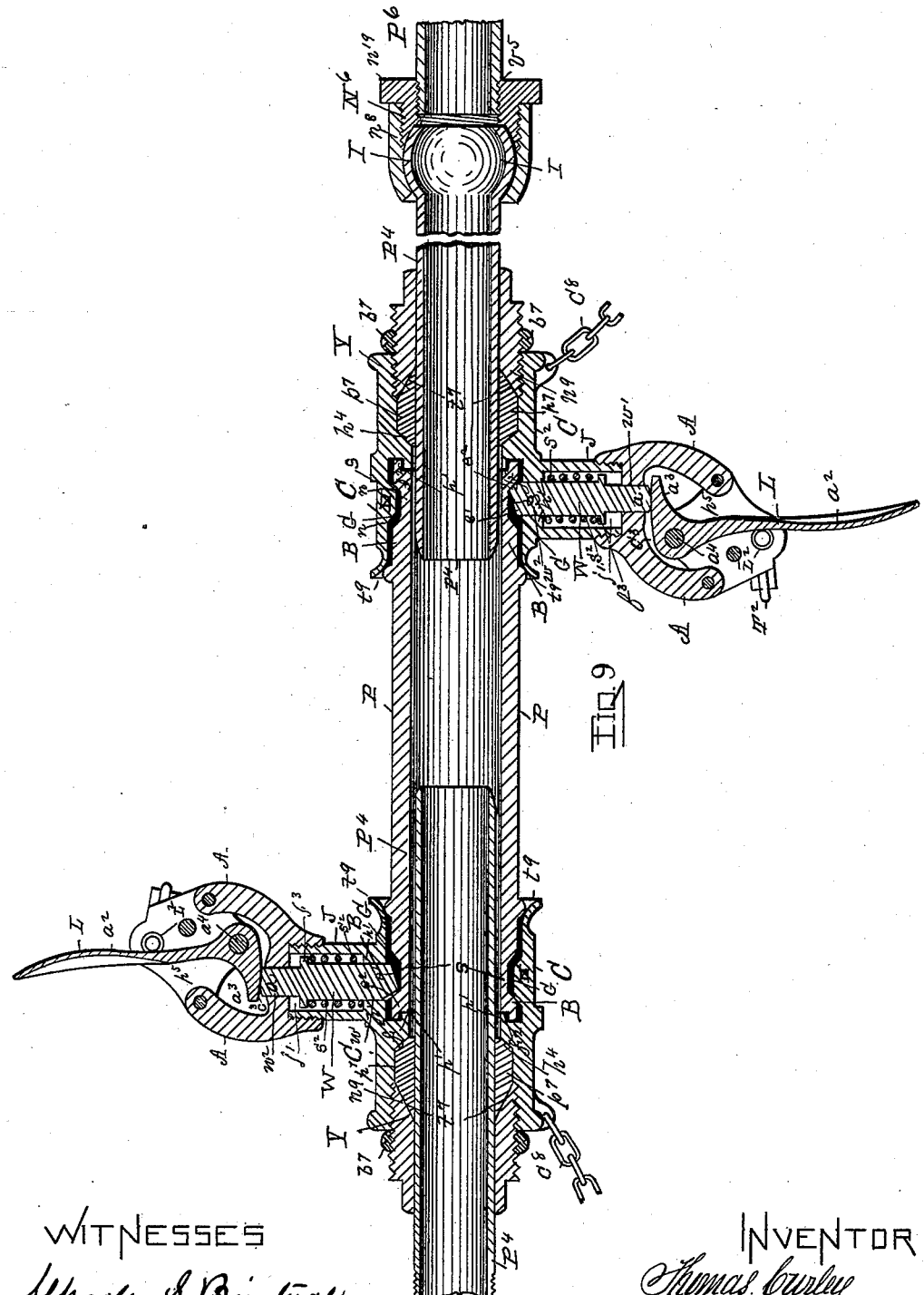
WITNESSES
INVENTOR
Thomas Curley
by W. E. Hagan atty (No Model.) 5 Sheets—Sheet 5.
T. CURLEY.
COUPLING FOR RAIL CAR STEAM HEATING PIPES.
No. 416,325. Patented Dec. 3, 1889.
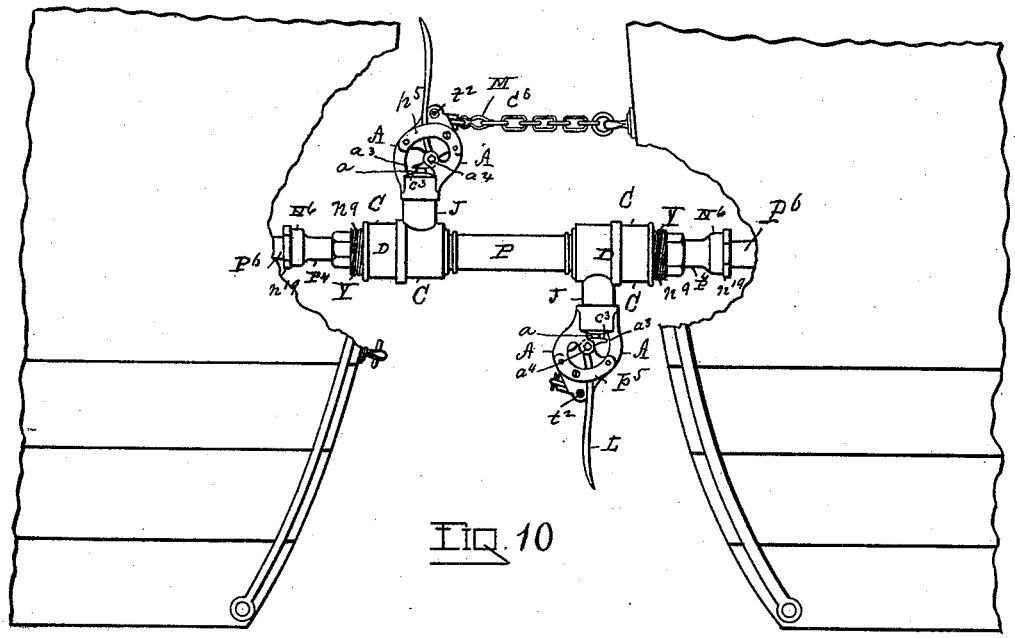
Fig. 10
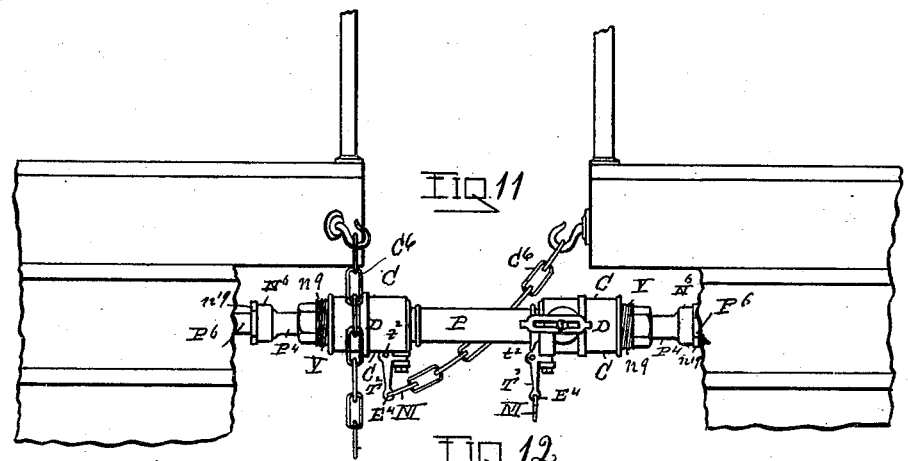
Fig. 11
Fig. 12
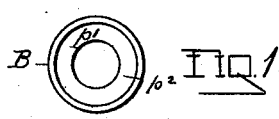
Fig. 13
WITNESSES
Charles S. Bushnell
William A. Sweet
INVENTOR
Thomas Curley
by W. E. Hagan atty

UNITED STATES PATENT OFFICE.

THOMAS CURLEY, OF TROY, NEW YORK, ASSIGNOR OF ONE-HALF TO WILLIAM BAILEY, OF SAME PLACE.

COUPLING FOR RAIL-CAR STEAM-HEATING PIPES.

SPECIFICATION forming part of Letters Patent No. 416,325, dated December 3, 1889.

Application filed April 1, 1889. Serial No. 305,506. (No model.)

*To all whom it may concern:*

Be it known that I, THOMAS CURLEY, of the city of Troy, county of Rensselaer, and State of New York, have invented new and useful Improvements in Couplings for Rail-Car Steam-Heating Pipes, of which the following is a specification.

My invention relates to improvements upon that class of couplings which are used to connect the steam-pipes that convey steam for heating purposes from one car to another of a railway-train, and which are applied to the ends of the steam-pipes at each end of the cars and are used in connection with a short pipe or hose having entering-butts at each of its opposite ends.

The object and purpose of my invention are to dispense with the use of threads upon the couplings for making the connection, to render the operation of the coupler mechanism prompt and efficient, and to adapt it (when desired) to be disconnected by the uncoupling of the cars.

Accompanying this specification to form a part of it there are five plates of drawings, containing thirteen figures, illustrating my invention, with the same designation of parts by letter-reference used in all of them.

Of the illustrations, Figure 1 shows a top view of one of the couplers, with the wedging-bar which forces the entering-butt of the short pipe to its seat shown as raised. Fig. 2 shows one of the couplers as connected to the entering end of the short pipe and with the wedging-bar illustrated as forced down to crowd the entering-butt to its seat and with the lever which operates said bar shown as locked by the latch-bolt. Fig. 3 shows an end view of one of the couplers with the opening wherein the entering butt-end of the short connecting-pipe is entered to make the connection illustrated as facing the view. Fig. 4 shows a transverse section taken centrally through the coupler shown at Fig. 1, and also through the entering butt-end of the short connecting-pipe, with the wedging bar or bolt shown as raised and its position when it is forced in to make the connection indicated by a dotted line. Fig. 5 shows a top view of the coupler used in connection with the one shown at Fig. 1, two of them being required to make a set, each of which is the counterpart of the other, so far as their mechanical elements are concerned, and with one of them arranged upon each end of the steam-heating pipe of each car of the train. Fig. 6 is a top view of the wedging bar or bolt, shown as detached from the other mechanism. Fig. 7 is a vertical section taken centrally through the latch-bolt, the spring surrounding it, and the cylinder inclosing it, with the lever operating it shown in elevation. Fig. 8 shows a top view of a connection made between the ends of the steam-heating pipes of the two cars, and in which connection the short pipe consists of a telescoping pipe made with a ball-and-socket joint, and in which, although shown at but one end, it is used in the connecting-pipe at each end of the car. Fig. 9 shows a section taken transversely and centrally through the mechanism shown at Fig. 8. Fig. 10 shows a top view of a steam-pipe connection made between the ends of two cars, with a part of each of the latter shown; and Fig. 11 shows a side view of the parts illustrated at Fig. 10. Fig. 12 shows in elevation a piece of hose-pipe having upon each of its ends butts for connecting with the coupler parts, and the form of which butts is the same whether the short pipe is made of hose or as having a telescopic construction and a ball-and-socket joint is used. (Illustrated at Figs. 8 and 9.) Fig. 13 shows an end view of one of the entering-butts.

The several parts of the mechanism thus illustrated are designated by letter-reference, and the function of the parts is described as follows:

The letters B designate the butts or entering ends of the coupling mechanism, and of which there is one upon each of the opposite ends of the short pipes used between the cars.

The letter G designates a groove encircling each of said butts, and $g'$ the beveled sides of the said groove G, which are made to taper inwardly and toward each other to the stem part $s$, as shown at Figs. 4, 9, and 12.

The letter $p'$ designates a countersink made in the facing end of each of the butts to receive a packing $p^2$, as shown at Fig. 13.

The letter P designates the short pipe used between the cars, and on the ends of which the butts B are placed, and the construction and operation of the butts are the same whether applied to the short pipe made of hose, as shown at Fig. 12, or the metallic pipe made to operate telescopically by means of a ball and socket, as shown at Figs. 8 and 9.

The letters C designate the coupler proper, each of which is constructed with a tube-form body part D, having open ends E and an interior encircling flange $f^2$, against which the packing-face of the entering-butt B engages when the latter is forced there by the wedging bolt or bar W, the operation of which latter will be more fully described hereinafter.

The letter N designates a lip that is upwardly projected from the interior of the coupler C, which lip has beveled sides $n$ and is arranged upon the interior at the side thereof which is opposite to that at which the wedging bar or bolt W is operated. The interior form and construction of the coupler part C are shown at Figs. 3, 4, and 9.

The letter J designates a tube-form part of the coupler C, that is projected laterally therefrom and at right angles thereto, and the letter $j'$ designates a chamber formed in said part J, and $w'$ a slideway at the inner end of the chamber, and $w^2$ a slideway at the outer end thereof for the movement of the bolt or bar W. The latter is made with an encircling flange $f^3$ and at its wedging end with the two bevels $e'$ $e^2$, with the bevel $e^2$ having a concavity that is coincident with the convexity of the bevel of the groove G of the butt, taken circumferentially, so that when the bolt or bar W is forced down its rounded bevel-surface will engage with the circumferentially inner rounded bevel of the groove G. The upper end $a$ of the wedging bolt or bar W, when not forced in to make the connection, projects above the tube-form part J.

The letter $g^6$ designates a groove made longitudinally in the bolt or bar W, and $p^8$ a pin passing through the wall of the tube J to enter said groove to keep the bar from turning in its slideways.

The letter $S^2$ designates a spiral spring arranged within the chamber $j'$ to encircle the wedging bar or bolt W between the flange $f^3$, formed thereon, and the shoulder $h'$ at the bottom of said chamber. As thus constructed and arranged said wedging bolt or bar W is forced in against the recoil force of said spring $S^2$. The latter and its relative position in the mechanism are shown at Figs. 9 and 4.

The letters A designate two arms that are projected outwardly from the tubular part J from opposite sides thereof, and these arms are connected by a plate $p^5$.

The letter L designates an angular lever having a handle-arm $a^2$, a bearing-arm $a^3$, and a pivoted fulcrum $a^4$. The bearing-arm $a^3$ is made with a curved cam-surface $c^3$, and is adapted, as the handle-arm is moved in the direction of the dotted line $d^4$ of Fig. 5, to engage with the projecting end $a$ of the bolt or bar W to force the latter in against the force of the spring $S^2$.

The letter $L^2$ designates a bolt-latch arranged within the tube-form chamber $c^4$. This bolt-latch has its latch end $e^6$ made conical and is adapted to slide into and from out of the chamber $c^4$ thereat, where, within the chamber, it is made with a shoulder $h^2$, and, as reduced in diameter by the latter, it extends through and from out of and beyond the outer end of said chamber at $n^6$, and at its outer end is provided with a tripping-nut $n^7$. The letter $S^3$ designates a spiral spring encircling said latch-bolt between the shoulder $h^2$ and the end of the chamber $c^4$, (designated at $k$.) As thus arranged said bolt-latch at its conical end, where engaging with the angular lever L, is forced to latch the latter by the force of the spring $S^3$.

The letter $T^2$ designates a tripping-lever that is pivoted at $t^2$, and back of where thus pivoted is constructed with a projection $o^2$, that engages with the tripping-nut $n^7$, so that when the lever $T^2$ is pulled out by the chain $C^6$ the bolt-latch is drawn back. The construction of this bolt-latch and combined tripping-lever is shown in detail at Figs. 3 and 7.

The operation of the mechanism thus described is as follows: One of the butts B having been passed into the open end E of the coupler part, and so that the bevel upon the end thereof is caught by the bevel of the lip N therein and the lever L is operated to force in the bolt or bar W, the bevel of the latter engages with the bevel of the butt and forces the end of the latter to face on the flange $f^2$ of the coupling interior. The lever L while being moved engages with the cone-form end of the bolt-latch to crowd it in, so that the lever L passes it, when the latch-bolt by the action of the spring is forced out again as soon as the lever L has passed over its conical end, and the connection is made and the lever L locked.

The letter M designates a pinch or spring link, which has one closed end that is within the eye $E^4$ of the tripping-lever end and one end that is closed by the springs $m^2$ $m^2$, so that when another link of the chain $C^6$ is caught therein and is pulled upon by the opposite car to which its other end is connected the link M resists until sufficient force is exerted to pull back the bolt-latch and trip the latter and lever L, when the chain pulls through and from out the springs $m$. As the lever L is thus tripped the spring $S^2$ raises the wedging bolt or bar W from out of the groove G of the butt and the parts are disconnected.

At Figs. 8 and 9 the short pipe P used between the couplers is made to operate telescopically as to adjustment for the distance between the cars, and the pipe entering it is constructed with a tubular ball and socket, so that the connection may be flexible to adapt it to the movement of the cars when swaying or when in turning upon curved parts of the track, and this metallic connection, when used instead of the hose-pipe, (indicated at Fig. 12,) is constructed as follows:

The letter P designates the short pipe, which has the butts B upon its opposite ends, and P⁶ the steam-heating-pipe end coming from the car. This pipe P⁶ enters the short pipe, so as to telescopically slide therein for adjustment as to distance.

The letter Y designates a stuffing-box constructed with an encircling shoulder $h^4$, having a nut $n^9$ threaded onto the interior of the stuffing-box. This nut has a trumpet-shaped interior (indicated at $t^7$) and runs between the packing $p^7$ and the pipe P⁴ sufficiently to crowd the packing closely around said pipe.

The letter $b^7$ designates a keeper-ring that is threaded onto the stuffing-box outside of the nut $n^9$.

The letter I designates a ball-form exterior produced upon and so as to encircle the cylindrical face of the telescopically-sliding pipe P⁴ near that one of its ends which is next to the car, and N⁶ a two-part nut having the part $n^8$, adapted to be passed on over the pipe P⁴ and the nut part $n^{19}$, threaded to screw into the nut part $n^8$, with the interior surface of the two-part nut rounded out, so as to surround with steam-tight contact the exterior encircling ball-form part of the pipe P⁴.

The letter P⁶ designates the pipe which connects with the car-interior, and this pipe is screwed into the end of the two-part nut N⁶, as indicated at $v^5$.

The letter C⁸ designates chains connecting the coupler parts with the car, so that in case the telescoping pipe should be drawn out from the coupling by any contingency the latter would be held up. Preferably the coupler parts are made with trumpet-shaped openings for the entering of the butts, as shown at $t^9$, Fig. 9.

I am aware of the fact that a hose-coupling has been made with an interior facing flange, an upwardly-projecting and interiorly-placed lip, and a threaded wedging-bolt that was operated when screwed inwardly to engage with the sides of a beveled groove formed to encircle the entering-butt, so as to crowd the latter to engage with the facing flange and make a connection. My improvement upon this feature, to adapt it for the purposes designed, consists in the dispensing with the threaded bolt and the substitution therefor of a bolt operated by a lever against the force of a spring, so that the connection can be made promptly and the parts disconnected automatically.

Having thus described my invention, what I claim, and desire to secure by Letters Patent, is—

1. In a coupling mechanism for connecting the steam-heating pipes of a railway-train of cars, the combination of a coupler part which is open at one of its ends for coupler attachment and at the other end for a steam-pipe connection, and made with an interiorly-arranged encircling flange and inwardly-projecting and beveled lip at its coupling end, and provided with a bolt having a guideway, an encircling spring, and a beveled entering end, a pivoted angular lever constructed to operate said bolt against the force of said spring, and a pipe-butt constructed with an end packing-face and an exteriorly-placed encircling groove at its entering end, constructed and arranged to operate substantially in the manner as and for the purposes set forth.

2. In a coupling mechanism for connecting the steam-heating pipes of a railway-train of cars, the combination of a coupler part which is open at one of its ends for coupler attachment and at the other end for a steam-pipe connection, and constructed at its coupler connecting end with an interiorly-arranged encircling flange and an inwardly-projecting beveled lip, a bolt provided with a slideway containing an encircling spring and constructed with a beveled entering end, an angular lever constructed and arranged to operate said bolt against the force of said spring, a latch-bolt provided with an encircling spring and adapted to engage with said lever, and an entering-butt having a packing-face and made with an exteriorly-placed encircling groove at its entering end, constructed and arranged to operate substantially in the manner as and for the purposes set forth.

3. The combination, with the steam-heating pipes of each two cars of a railway-train, of one of the coupler parts C upon the approaching end of each of said steam-heating pipes, said coupler parts each being constructed with the interiorly-placed facing-flange $f^2$, the beveled lip N, and having the wedging-bolt W, constructed with a beveled entering end, operated by the angular lever L, bolt-latch $L^2$, and tripping-lever T, substantially as described, and the adjustable pipe P, having at each of its opposite ends the butt B, constructed with a packing end face and an encircling beveled groove, substantially as and for the purposes set forth.

4. The combination, with the steam-heating pipes of each two cars of a railway-train, of one of the coupler parts C, arranged upon the approaching ends of each of said steam-heating pipes, each of said coupler parts being constructed with the interiorly-placed facing-flange $f^2$, the beveled lip N, and having the wedging-bolt W, constructed with a beveled entering end, operated by the angular lever L, bolt-latch $L^2$, tripping-lever $T^2$, substantially as described, the adjustable pipe P, having at each end the butt B, made with a packing end face, and an encircling beveled groove, the pinch-link M, connected to the eye of said tripping-lever, and the chain $C^4$, connected to said pinch-link and to the adjacent end of the opposite car, substantially in the manner as and for the purposes set forth.

5. The combination of the coupler part C, made with the interior flange $f^2$, and beveled lip N, stuffing-box Y, and having the wedging-bolt W, made with a beveled entering end and operated by the pivoted lever L, substantially as described, the butt B, made with a packing end face and having an encircling beveled groove made on the exterior thereof, the telescopically-sliding pipe $P^4$, adapted to enter the coupler part C at its end opposite to that which connects with the butt B, and at its opposite end made with the ball-form exterior I, and the pipe $P^6$, having thereon the two-part nut $N^6$, adapted to encircle said ball-form exterior I on the coupler-pipe $P^4$, substantially in the manner as and for the purposes set forth.

6. The combination, with the steam-heating pipes $P^6$ of each two cars of a railway-train, each of said pipes being constructed with the interiorly-rounded-out two-part nut $N^6$, of the telescopically-arranged pipe $P^4$, made with the ball-form exterior I, adapted to make an adjustable steam-tight connection when within said two-part nut, the coupler parts C C, each made with stuffing-box Y, to receive the entering end of the pipe $P^4$, and each having the wedging-bolt W, made with a beveled end and operated by a pivoted lever, substantially as described, and the pipe P, having at each end one of the butts B, adapted to connect with each of said coupler parts, substantially in the manner as and for the purposes set forth.

Signed at Troy, New York, this 13th day of February, 1889, in the presence of the two witnesses whose names are hereto written.

THOMAS CURLEY.

Witnesses:
W. E. HAGAN,
CHARLES S. BRINTNALL.